US011543948B2

(12) United States Patent
Hoggarth et al.

(10) Patent No.: US 11,543,948 B2
(45) Date of Patent: Jan. 3, 2023

(54) VEHICLE DISPLAY SYSTEM AND METHOD FOR DETECTING OBJECTS OBSCURING THE DISPLAY

(71) Applicant: FORD GLOBAL TECHNOLOGIES, LLC, Dearborn, MI (US)

(72) Inventors: Marcus Hoggarth, Herts (GB); David Mingay, Weybridge (GB); Pierre Bernuchon, London (GB); Harriet Dodds, London (GB)

(73) Assignee: Ford Global Technologies, LLC, Dearborn, MI (US)

( * ) Notice: Subject to any disclaimer, the term of this patent is extended or adjusted under 35 U.S.C. 154(b) by 360 days.

(21) Appl. No.: 16/192,181

(22) Filed: Nov. 15, 2018

(65) Prior Publication Data

US 2019/0155489 A1 May 23, 2019

(30) Foreign Application Priority Data

Nov. 23, 2017 (GB) ...................................... 1719449

(51) Int. Cl.
*G06F 3/04845* (2022.01)
*B60K 35/00* (2006.01)
(Continued)

(52) U.S. Cl.
CPC .......... *G06F 3/04845* (2013.01); *B60K 35/00* (2013.01); *B60K 37/06* (2013.01);
(Continued)

(58) Field of Classification Search
CPC .......... B60K 2370/744; B60K 2370/77; B60K 2370/785; B60K 2370/788;
(Continued)

(56) References Cited

U.S. PATENT DOCUMENTS 9,452,678 B1 * 9/2016 Boss ...................... B60K 35/00
2010/0177931 A1 * 7/2010 Whytock ............ G06F 3/04812
382/103

(Continued)

FOREIGN PATENT DOCUMENTS

CN 203024783 U 6/2013
EP 2988194 A1 2/2016
(Continued)

OTHER PUBLICATIONS

"Autonomous Cabin Concept", Sep. 22, 2017, Panasonic Automotive Systems Europe, retrieved from the Internet [URL: http://eu.automotive.panasonic.com/solutions/infotainment/ecockpit/autonomous-cabin-concept] (Year: 2017).*
(Continued)

*Primary Examiner* — Daniel Samwel
(74) *Attorney, Agent, or Firm* — Brooks Kushman P.C.; Frank Lollo (57) ABSTRACT

A method for controlling a display system of a motor vehicle via a controller is provided. An image is generated on a surface of the motor vehicle, and an object placed on the surface is detected. The image is adjusted such that at least a portion of the image is moved from a first area of the surface in which the object has been detected to a second area of the surface. A display system for a motor vehicle configured to perform the method is also provided.

14 Claims, 7 Drawing Sheets

(51) Int. Cl.
  *B60K 37/06* (2006.01)
  *H04N 5/262* (2006.01)
  *G09G 5/38* (2006.01)
(52) U.S. Cl.
  CPC ..... *H04N 5/2628* (2013.01); *B60K 2370/152* (2019.05); *B60K 2370/52* (2019.05); *G09G 5/38* (2013.01); *G09G 2340/0464* (2013.01); *G09G 2380/10* (2013.01)
(58) Field of Classification Search
  CPC ........ B60K 2370/791; B60K 2370/794; B60K 2370/771; B60K 2370/774; B60K 2370/777; B60K 2370/779; B60K 2370/782; B60K 2370/741
  See application file for complete search history.

(56) References Cited

U.S. PATENT DOCUMENTS

| | | | |
|---|---|---|---|
| 2011/0141057 A1* | 6/2011 | Sizelove | B60N 3/004 |
| | | | 345/174 |
| 2011/0234481 A1 | 9/2011 | Katz et al. | |
| 2015/0254809 A1* | 9/2015 | Shibata | G06T 3/60 |
| | | | 345/649 |
| 2017/0028876 A1* | 2/2017 | Yamada | B60N 2/06 |
| 2017/0028987 A1* | 2/2017 | Yamada | B60N 2/062 |
| 2017/0047049 A1* | 2/2017 | Nakao | G09G 5/38 |
| 2017/0091904 A1* | 3/2017 | Ventress, Jr. | G06F 3/14 |
| 2017/0168659 A1* | 6/2017 | Nam | G06F 3/0481 |
| 2017/0232842 A1* | 8/2017 | Kobayashi | B60K 37/02 |
| | | | 359/633 |
| 2018/0052494 A1* | 2/2018 | Coburn | G06F 1/1675 |
| 2018/0244175 A1* | 8/2018 | Tan | B60N 2/0248 |
| 2018/0273050 A1* | 9/2018 | Tertoolen | B60R 1/00 |
| 2019/0152319 A1* | 5/2019 | Wan | B60K 37/06 |
| 2019/0291617 A1* | 9/2019 | Schlierf | B60N 2/0292 |
| 2020/0101977 A1* | 4/2020 | Nakai | G05D 1/0088 |

FOREIGN PATENT DOCUMENTS

| | | |
|---|---|---|
| JP | 2004077516 A | 3/2004 |
| JP | 2014175745 A | 9/2014 |
| JP | 2015028543 A | 2/2015 |
| KR | 20160123784 A | 10/2016 |

OTHER PUBLICATIONS

Panasonic Automotive Systems Europe, "Panasonic Autonomous Cabin", Jan. 5, 2017, YouTube, retrieved from the Internet [URL: https://www.youtube.com/watch?v=CyJVfoHDUXs&feature=emb_logo] (Year: 2017).*
Extended European Search Report for Application No. 18205758.8, dated Mar. 19, 2019, 7 pages.
GB Examination Report GB 1 719 449.9 Filed May 16, 2018. 7 pages.

* cited by examiner

VEHICLE DISPLAY SYSTEM AND METHOD FOR DETECTING OBJECTS OBSCURING THE DISPLAY

CROSS-REFERENCE TO RELATED APPLICATIONS

This application claims foreign priority benefits under 35 U.S.C. § 119(a)-(d) to GB Application 1 719 449.9 filed Nov. 23, 2017, which is hereby incorporated by reference in its entirety.

TECHNICAL FIELD

Various embodiments relate to a display system for a motor vehicle and for a display system configured to improve visibility of images generated by the display screen for occupants of the motor vehicle.

BACKGROUND

Vehicles, such as motor vehicles, often include an interior trim portion, such as a center console, which is arranged between the occupants of the vehicle. The interior trim portion may include an upper surface configured to enable the occupants to work or perform other activities using materials placed on the upper surface, or to place objects on the surface of the interior trim portion to be accessed during a journey.

Vehicles often also include a display system configured to display information or entertainment media to occupants of the vehicle. A display device of the display system may be configured to display the image on an internal surface of the vehicle. For example, the display system may include a display screen integrated into the internal surface.

The interior trim portion may be arranged in a convenient position to be seen by each of the occupants of the vehicle. Hence, it may be desirable for the display screen to be integrated into a surface of the interior trim portion, e.g. the upper surface. However, if objects are positioned on the upper surface of the interior trim portion by the occupants, areas of the image being displayed by the display system may be obscured, distorted or blocked due to the presence of the objects, making it difficult for occupants to discern information being provided in the image.

SUMMARY

According to an aspect of the present disclosure, there is provided a method for a display system of a motor vehicle, the method comprising: generating an image on a surface of the motor vehicle; detecting an object placed, e.g. resting, on the surface; adjusting the image such that at least a portion of the image is moved from a first area of the surface in which the object has been detected to a second area of the surface, e.g. away from the object.

The surface may be provided on an interior trim portion of the motor vehicle, such as a table.

The image may be generated by projecting the image onto the surface. Additionally or alternatively, the image may be generated by one or more display elements provided at or below the surface, such as light-emitting diode (LED), liquid crystal display (LCD), or organic light-emitting diode (OLED) display elements. For example, a display screen may be integrated into a trim portion of the vehicle on which the surface is provided.

Detecting an object placed on the surface may include capturing an image, such as a three-dimensional (3D) image, of the surface. Detecting an object placed on the surface may further include identifying the presence of an object on the surface within the image. Additionally or alternatively, detecting an object placed on the surface may include referring to measurements from one or more touch sensors provided at or below the surface.

The method may further include adjusting the shape, size and/or formatting of at least the portion of the image to be moved according to the second area of the surface, e.g. according to the shape and/or size of the second area, so that the portion of the image can be fitted into the second area.

The method may further include determining at least the portion of the image to be moved based on the size, shape and/or position of the object and a content item within the image, e.g. at least partially covered by the object. For example, the portion may be selected such that an item of content within the image is contained, e.g. entirely contained, within the portion.

The method may include determining a further portion of the image associated with the portion of the image to be moved. For example, the content within the further portion of the image may be associated with the content within the portion to be moved. The method may further include moving the further portion together with the portion.

The method may further include adjusting the size, shape and/or formatting of the further portion according to the second area of the surface, e.g. such that the portion and further portion can be fitted into or adjacent to the second area.

The size, shape and/or formatting of the portion and further portion may be adjusted together according to the second area, e.g. such that the portion and further portion can be fitted into the second area. For example, the content provided in the portion and further portion may be merged when the portion and further portion are moved to the second area. In other words, the content provided in portion and further portion may not be distinguishable from one another in the image provided in the second area.

The motor vehicle may have one or more seats for occupants of the vehicle, the position and/or orientation of the seats within an interior of the motor vehicle being variable. The method may include determining a position and/or orientation of the seats; determining an orientation of at least a part of the image according to the position and/or orientation of the seats; and displaying the image such that at least the part of the image is in the determined orientation. The part may include the portion of the image to be moved. The part may include a further portion of the image not within the portion of the image to be moved.

The method may further include determining a change in the position and/or orientation of the seats and adjusting the orientation of the image or part thereof according to the change in position and/or orientation of the seats. The method may further include adjusting the portion of the image moved into the second area according to the position of the object relative to the image following the change in orientation.

The method may further include adjusting the position of the second area and/or the orientation of the portion of the image according to a change in position and/or orientation of the seats, e.g. to account for a change in the position of the object relative to the image following the change in position and/or orientation of the seats.

The method may further include determining an orientation of the motor vehicle. The position and/or orientation of at least part of the image relative to the vehicle may be determined according to the orientation of the motor vehicle.

The method may include determining a change in the orientation of the motor vehicle and adjusting the orientation of the image or part thereof according to the change in orientation of the motor vehicle. The method may further include adjusting the portion of the image moved into the second area according to the position of the object relative to the image following the change in orientation.

The method may include adjusting the position of the second area and/or the orientation of the portion of the image according to a change in orientation of the motor vehicle.

According to another aspect of the present disclosure, there is provided a display system for a motor vehicle, the system having: a display device configured to display an image on a surface of the motor vehicle, e.g. such as the surface of a display screen or a surface of a trim portion; an object detector configured to detect objects placed on the surface; and a controller with one or more module configured to perform the above-mentioned method.

The display device may have a projector configured to project the image onto the surface. Additionally or alternatively, the display device may have a plurality of display elements provided at or beneath the surface. For example, the display device may have a display screen integrated below the surface, e.g. within a trim portion of the vehicle.

The object detector may include a camera, e.g. a 3D camera, arranged to capture an image of the surface. Additionally or alternatively, the object detector may include one or more touch sensors provided at or below the surface.

The surface may be provided on an interior trim portion of the vehicle, such as a table provided within the vehicle interior.

A motor vehicle may be provided with the above-mentioned display system.

To avoid unnecessary duplication of effort and repetition of text in the specification, certain features are described in relation to only one or several aspects or embodiments of the invention. However, it is to be understood that, where it is technically possible, features described in relation to any aspect or embodiment of the disclosure may also be used with any other aspect or embodiment of the disclosure.

For a better understanding of the present disclosure, and to show more clearly how it may be carried into effect, reference will now be made, by way of example, to the accompanying drawings, in which:

DETAILED DESCRIPTION

As required, detailed embodiments of the present disclosure are provided herein; however, it is to be understood that the disclosed embodiments are merely examples and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
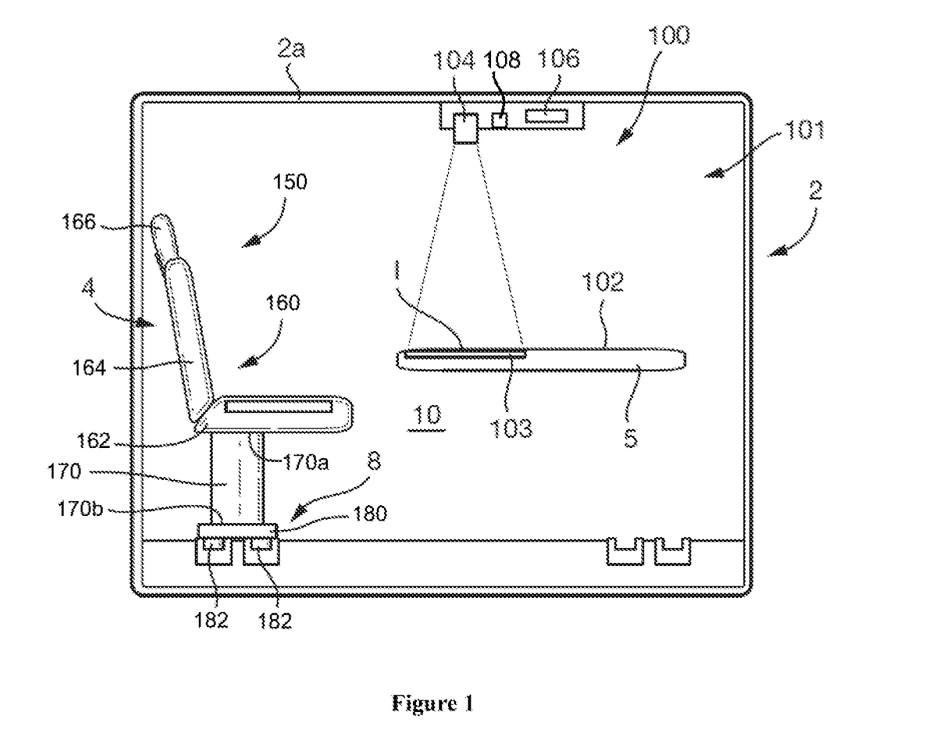
FIG. 1 is a schematic sectional view of a motor vehicle according to arrangements of the present disclosure.

With reference to FIG. 1, a motor vehicle 2 has a seating system 4, an interior trim portion, such as a table 5 with an upper surface or a horizontal surface, and a display system 100. The display system 100 has a display device 101 configured to display an image I, and a controller 106, having one or more modules, configured to control the operation of the display device 101.

In the arrangement shown in FIG. 1, the display device 101 has a display surface 102 and a projector 104 configured to project the image I onto the display surface 102. The display surface 102 is provided on the table 5 arranged within an interior space 10 of the vehicle 2, and tends along the upper surface of the table 5, e.g. extends in a horizontal plane. The projector 104 is arranged above the display surface 102 and is coupled to a roof 2a of the vehicle. However, in other arrangements of the disclosure, the display surface 102 may be provided on any other trim portion or interior surface of the vehicle and the projector 104 may be located in any suitable position in the vehicle from which it can project the image I onto the display surface 102.

Furthermore, although in the arrangement shown in FIG. 1, the image I is formed on the display surface 102 by projecting the image I using the projector 104, in other arrangements, the image I may be formed on the display surface 102 using another method. For example, the display surface 102 may be provided with a plurality of display elements, such as light emitting diodes or liquid crystal display elements, configured to form pixels of the image I to be displayed by the display system 100. Alternatively, the display surface may be provided by a display screen integrated into the interior trim portion. The image I may thereby be displayed directly on the display surface 102. In such arrangements, the projector 104 may be omitted and the controller 106 may control the operation of the display elements or display screen.

The controller 106 may be configured to generate the image I to be displayed by the display system 100. Furthermore, the controller 106 may be configured to determine orientations of the image I or one or more portions of the image I to be displayed by the display system on the display surface 102, as described below. In particular, the orientation of the image or portions thereof may be determined in order to improve the visibility of the image I to occupants sat within the vehicle 2 and/or in order to communicate information to the vehicle occupants by virtue of the relative orientations of the portions of the image I.

The display system 100 may further include a touch sensitive element 103 provided on or adjacent to the display surface 102 and configured to detect when a user of the display system is touching the display surface 102 at a particular location.

The touch sensitive element 103 may provide signals to the controller 106 indicating that the display surface 102 has been touched by the user. The signals may indicate the location or locations on the display surface 102 that were touched. In this way a user may interact with the image I provided by the display system 100.

In some arrangements, the touch sensitive element 103 may be embedded within the trim portion, e.g. such that the touch sensitive elements are provided at or beneath the surface of the trim portion.

The seating system 4 may include a guide track assembly 8 and a plurality of seats 150. The seats 150 are movably supported by the guide track assembly 8, such that the seats 150 are movable within the vehicle. In particular, the seats may be movable between predetermined seating positions 7, described below with reference to FIG. 4.

As depicted in FIG. 1, each of the seats 150 has a seat body 160 having a base 162, a back rest 164 and a head rest 166. The seat body 160 is supported by a seat pillar 170. The seat pillar 170 extends in a substantially vertical direction from a first end 170a of the seat pillar to a second end 170b. The first end 170a of the seat pillar is coupled to the seat body 160, e.g. to the base 162, and the second end 170b is coupled to a boss 180 of the seat 150.

In the arrangement shown in FIG. 1, the seat pillar 170 is a tubular support member having an obround cross-section. However, in other arrangements, the cross-section of the seat pillar 170 may be circular, oval, square, rectangular or any other desirable shape. Alternatively, the seat pillar 170 may be a solid beam, such as an I-beam or any other desirable structure or framework. When the seat pillar 170 is formed by a solid beam, such as an I-beam, or an alternative structure or framework, the seat pillar may include a tubular trim portion surrounding the solid beam, structure or framework.

The seat 150 includes one or more follower assemblies 182 coupled to the boss 180. The follower assemblies 182 are configured to engage the guide track assembly 8 in order to guide the movement of the seat 150 between seating positions. Additionally, the follower assemblies 182 and/or the boss 180 may be configured to support the seat 150 within the vehicle, e.g. to transfer any loads from the seat, such as the weight of a passenger sat in the seat, to a frame of the vehicle.

The seat body 160 may be movably, e.g. pivotally, coupled to the first end 170a of the seat pillar 170. The seat body 160 may therefore be able to pivot relative to the boss 180 to adjust the orientation of the seat within the vehicle. For example, the seat body 160 can be turned to face in the direction of travel of the vehicle 2 or to face into the interior space 10, e.g. towards the table 5.

In other arrangements, it is also envisaged that the seat pillar 170 may be pivotally coupled to the boss 180, such that the seat pillar 170 and the seat body 160 can be rotated relative to the guide track assembly 8 in order to adjust the orientation of the seats 150.

Figure 2A:
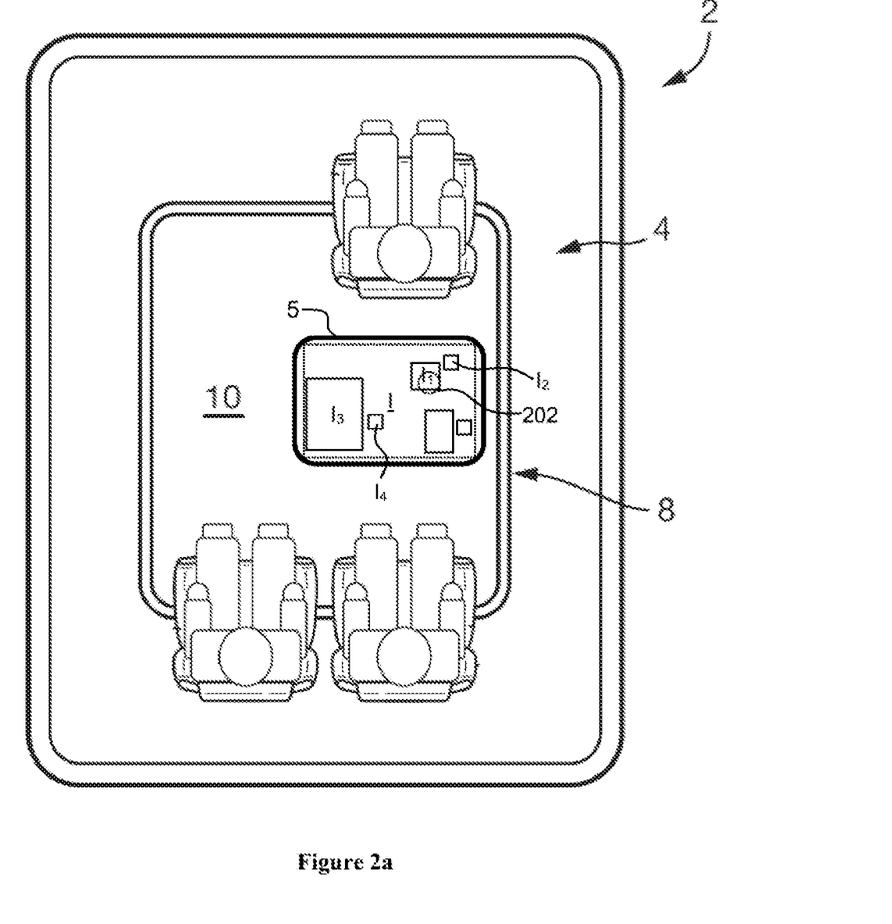
FIGS. 2A, 2B and 2C are schematic views of an interior of the motor vehicle comprising a display system according to the present disclosure.
Figure 2B:
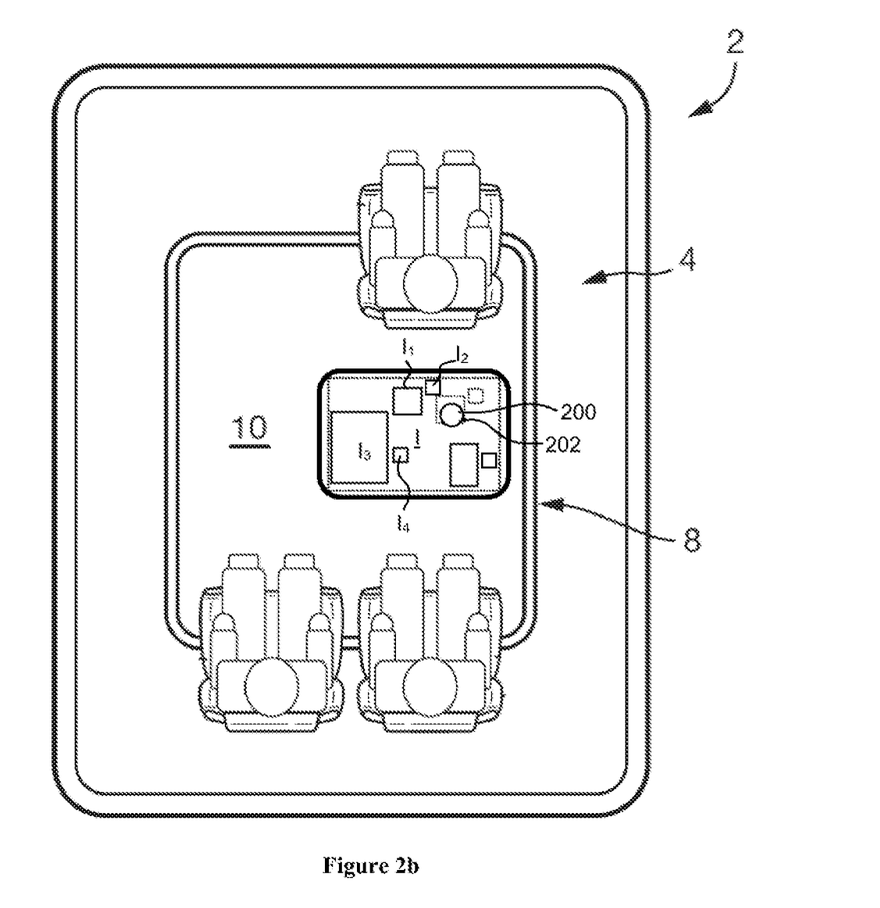

With reference to FIGS. 2A and 2B, at a particular point during a journey an object 200 may be placed on the table 5, such that a first area 202 of the display surface 102 is covered by the object.

Because the image I is being projected by the projector 104 on to the display surface 102 from above, the presence of the object 200 on the display surface 102 causes the image I being projected into the first area 202 to be distorted. In other arrangements, e.g. when the image is being produced by display elements provided in the display surface 102, the object may block the image I in the first area 202 from being viewed.

The image I may include an image background and one or more content items $I_1$, 12, 13, 14, such as pictures, videos, texts or any other items of information or entertainment content displayed as part of the image I produced by the display system 100. If a particular content item is being displayed in the first area 202, e.g. at least partially within the first area, the occupants of the vehicle may not be able to discern what is being displayed in the particular content item. For example, as depicted in FIG. 2A, before the object 200 is placed in the display surface 102, the first content item $1_1$ is displayed in the first area 202. At least a portion of the image in which the first content item $1_1$ is being displayed may therefore be moved.

Figure 3:
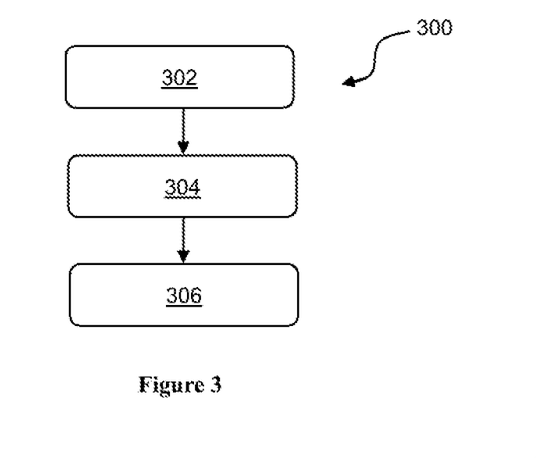
FIG. 3 shows a method for a display system of a motor vehicle according to arrangements of the present disclosure.

With reference to FIG. 3, the controller 106 may perform a method 300 according to arrangements of the present disclosure in order to improve visibility of the content items within the image for occupants of the vehicle.

The method 300 has a first step 302, in which an image is generated on a surface of the motor vehicle, e.g. on the display surface 102. In a second step 304 of the method, an object placed on the surface is detected. In a third step 306 of the method, the image is adjusted, such that a portion of the image is moved from the first area 202 of the surface in which the object has been detected to a second area 204 of the surface, e.g. away from the object, as shown in FIG. 2B.

As described above, a touch element 103 may be provided to sense when a user is touching the display surface. The touch element 103 may also be capable of detecting an object placed on the display surface 102. The touch element 103 may be used within the second step 304 of the method 300 to detect that the object 200 has been placed on the display surface 102 and may determine the size and shape of the object 200.

As mentioned above, a user may interact with the image by touching the display surface. Hence, the controller 106 may be configured to determine which of the touch readings recorded by the touch sensitive element 103 correspond to the user interacting with the image, and which correspond to objects being placed on the surface. For example, the controller 106 may determine whether the touch recorded by the touch sensitive element corresponds to the user interacting the image I based on the position, size, shape and/or duration of the touch detected.

The object 200 may include a portion that overhangs a base of the object 200. Hence, the area of the image I being distorted, obscured or blocked by the object 200 may be larger than the area of the base being detected by the touch element. In some arrangements, the display system may include one or more proximity or distance sensors provided on or adjacent to the display surface 102 capable of detecting a portion of the object 200 overhanging its base. The first area of the image 202 may be determined based on readings from the touch sensitive element 103 and/or the proximity or distance sensors.

Additionally or alternatively, as depicted in FIG. 1, the display system 100 may include an imaging device 108, e.g. a camera, such as a 3D camera, configured to capture an image of the display surface 102 and detect any objects placed on the display surface. The controller 106 may be configured to determine the area of the image I being distorted, obscured or blocked by objects placed on the display surface using the image captured by the imaging device. The controller 106 may determine the area of the image being distorted, obscured on blocked by determining the size, shape and/or position of the object 200. Additionally or alternatively, the controller 106 may determine the area of the image being distorted, obscured on blocked by comparing the captured image with the image generated by the controller 106 to be displayed on the display surface 102.

In one arrangement, the touch sensitive element 103 may detect a touch on the display screen. The imaging device 108 may capture an image of the display screen, and the controller 106 may determine, based on information from the touch sensitive element 103 and the imaging device 108, whether the touch corresponds to a user interacting with the display system 100 or an object being placed on the display screen 102. If the touch corresponds to an object being placed on the display screen 102, the controller 106 may determine the area of the image that may be distorted, obscured or blocked by the object, e.g. the first area 202 based on information from one or more of the touch sensitive element, proximity or distance sensor, and the imaging device.

As depicted in FIG. 2B, when a content item, such as the first content item $1_1$, is intended to be displayed in the first area 202 in which an object, such as the object 200, is placed, the image I may be adjusted such that at least a portion of the image is moved from the first area 202 of the display surface 102 to a second area 204 of the display surface 102, e.g. away from the object and where no other objects are positioned on the display surface.

All of image may be moved to avoid it being displayed in the first area 202. Alternatively, a portion of the image I may be moved from the first area 202, e.g. the portion of the image I that overlaps with the first area 202. (References to the portion of the image within this specification may refer to all of the image or a portion thereof.) The portion may include one or more content items of the image I intended to be displayed at least partially within the first area 202. In other words, the portion of the image to be moved may not include a further portion of the image that is intended to be displayed within the first area 202 but does not contain any part of a content item.

As depicted in FIG. 2A, the content item $1_1$ may be partially within the first area 202 and partially outside of the first area of the display surface 102 in which the object 200 is subsequently placed. However, it may be desirable to move the entire content item into the second area such that the content item $1_1$ is kept complete. The portion of the image I moved to the second area 204 may therefore include part of the image I, e.g. the parts of the first content item $1_1$, intended to be displayed outside of the first area 202.

In the arrangement shown in FIG. 2A, the content item intended to be displayed at least partially within the first area, e.g. the first content item $1_1$, is associated with the second content item $1_2$, which is intended to be displayed outside of the first area 202. It may therefore be desirable for the second content item $1_2$ to be moved together with the first content item $1_1$ to the second area 204 so that the related content items are kept close or adjacent to one another.

The size, shape and/or position of the second area 204 may be determined according to the size, shape and/or position of one or more further content items within the image I. Additionally or alternatively, the size, shape and/or position of the second area 204 may be determined according to one of more further objects placed on the display surface 102. In other words, the second area 204 may be determined in an area between objects and other content items of the image I. The second area 204 may be determined within a region of the image I that is viewable to an occupant of the vehicle, e.g. such that a line of sight from the occupants to the second area is not blocked by the object 200. For example, the second area 204 may be determined in an area of the display screen between one or more of the occupants and the object 200.

In the arrangement depicted in FIG. 2B, sufficient space is available on the display surface for a second area 204 to be identified that is substantially the same size and shape as the portion of the image to be moved. Hence, the portion of the image may be moved to the second area without being resized or rearranged in order to fit within the second area 204.

By contrast, in some arrangements, there may not be space available on the display surface 102 for the second area 204 to have the same size and shape as the portion of the image being moved. The shape and/or size of the portion of the image to be moved may therefore be adjusted, e.g. the portion of the image may be magnified or shrunk, when moving the portion of the image into the second area, for example, as shown in the arrangement depicted in FIG. 2C.

Figure 2C:
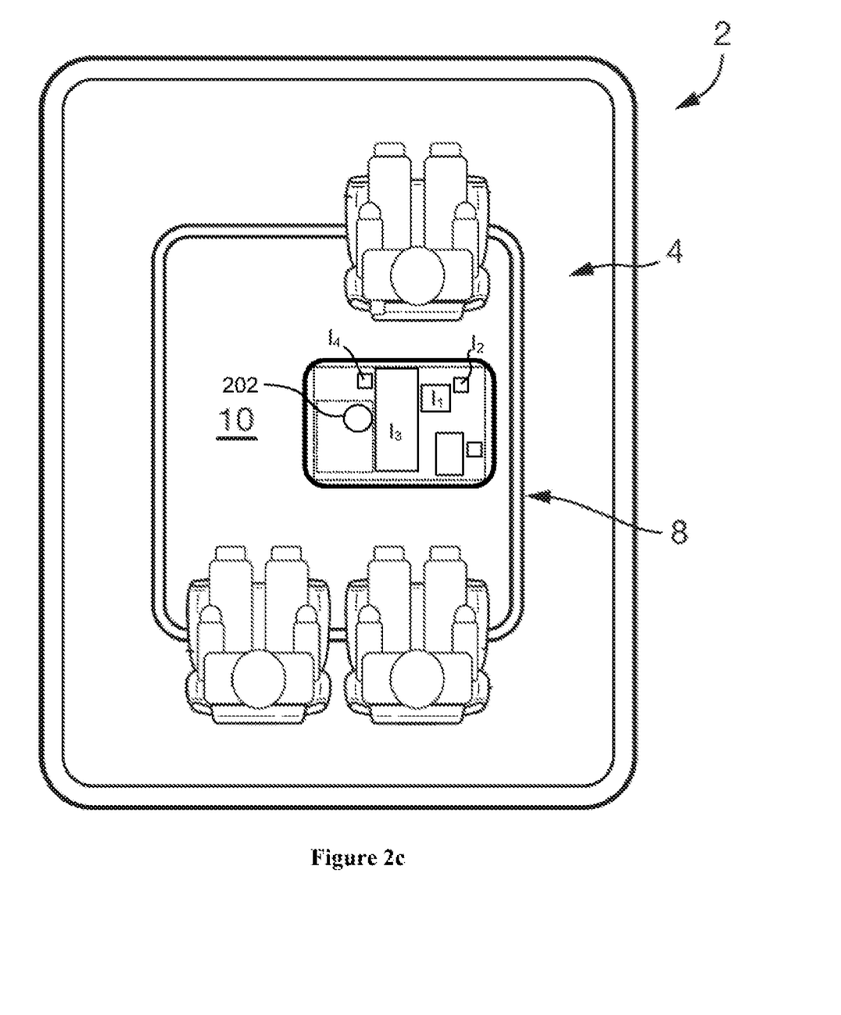

In some arrangements, the size and/or shape of parts of the portion of the image to be moved may be adjusted, independently of the other parts of the portion, e.g. according to a content item contained within the part of the portion. For example, as depicted in FIG. 2C, the size and/or shape of a part of the portion including the third content item $1_3$ is adjusted independently of a further part of the portion of image including the fourth content item $1_4$. In some arrangements, the size and/or shape of each part of the portion of the image, e.g. containing a different content item, may be adjusted independently of the other parts.

In some arrangements, the content items within the portion of the image to be moved may be rearranged or reformatted when the portion of the image is moved into the second area, e.g. so that it can be fitted into the second area. For example, the relative arrangements of content items within the portion of the image may be changed and/or the elements, such as words within a text, of one of more of the content items may be reformatted or rearranged such that the content item can be fitted into the second area 204.

It will be appreciated that, rearranging and reformatting the content items within the portion of the image to be moved may also affect the size and/or shape of the portion of the image. Rearranging and/or reformatting of the content items may be performed in addition to or as an alternative to adjusting the size and shape of the portion of the image to be moved.

In the arrangement described above, content items within the image that are not at least partially within and are not associated with content items at least partially within the first area 202 are not moved or adjusted within the image. However, in other arrangements of the disclosure, one of more of the other content items not within the portion of the image to be moved, may be rearranged within the image in order to increase the space within the image available for the second area 204.

Figure 4A:
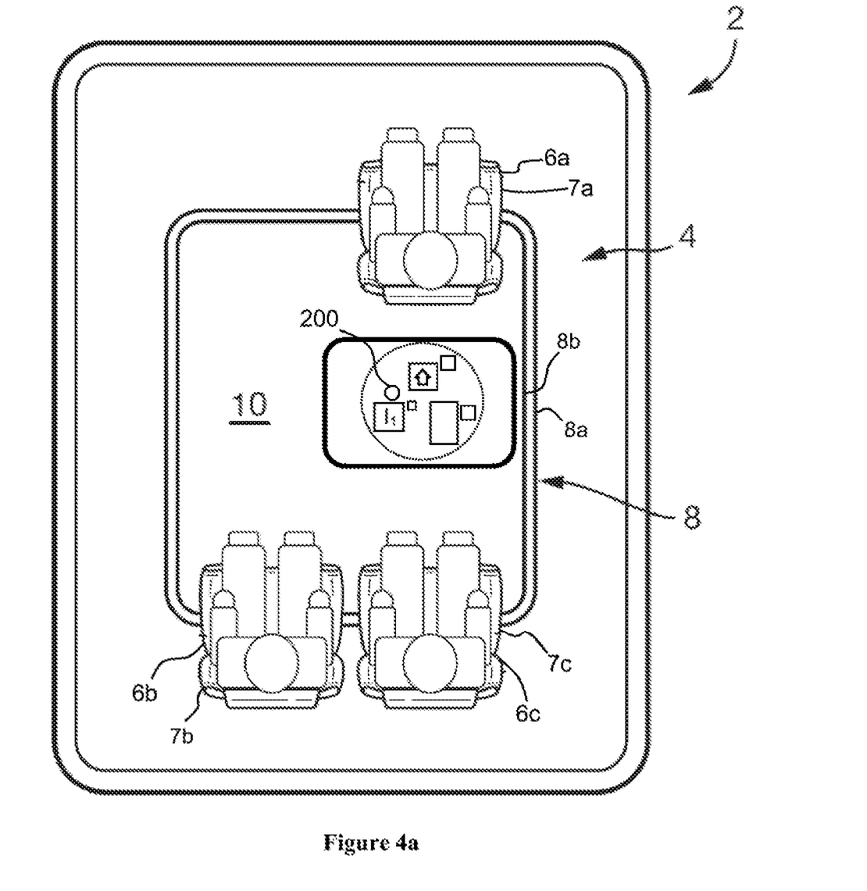
FIGS. 4A, 4B and 4C are schematic views of an interior of the motor vehicle illustrating seats of the motor vehicle, in first, second and third seating configurations.
Figure 4B:
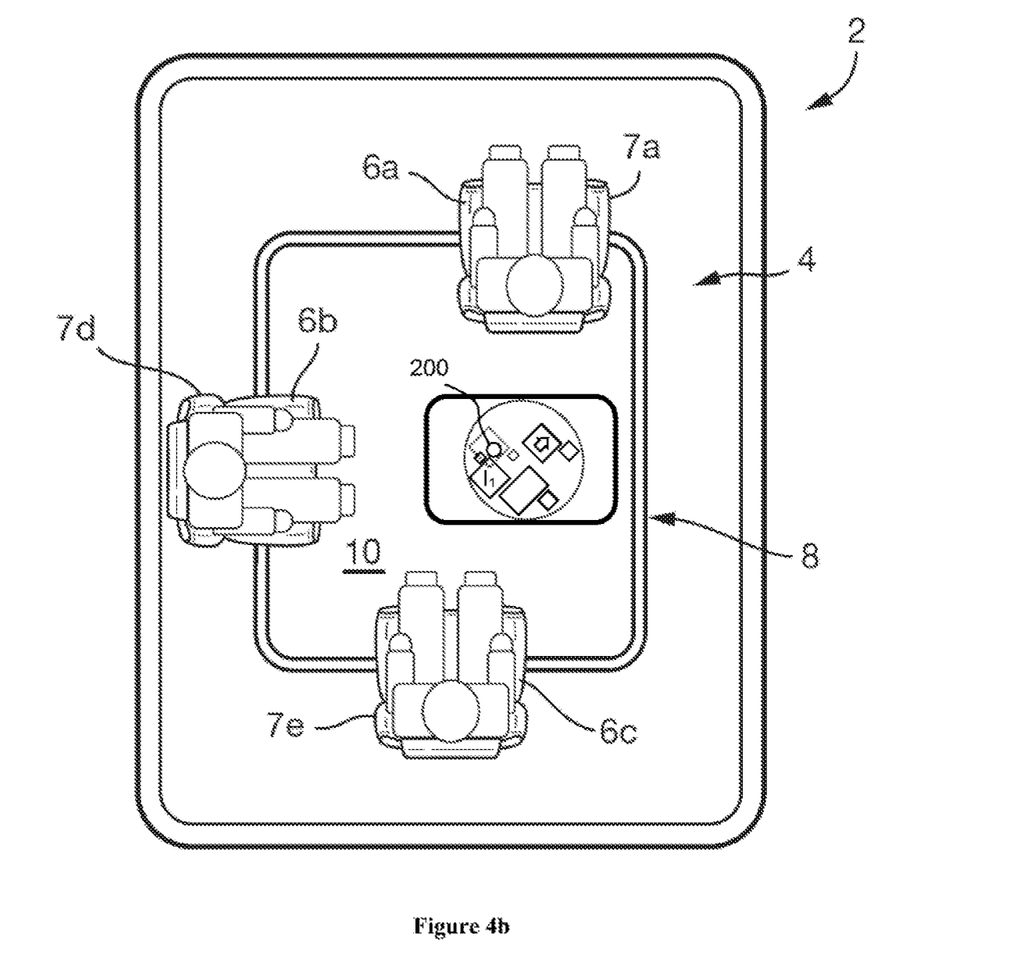
Figure 4C:
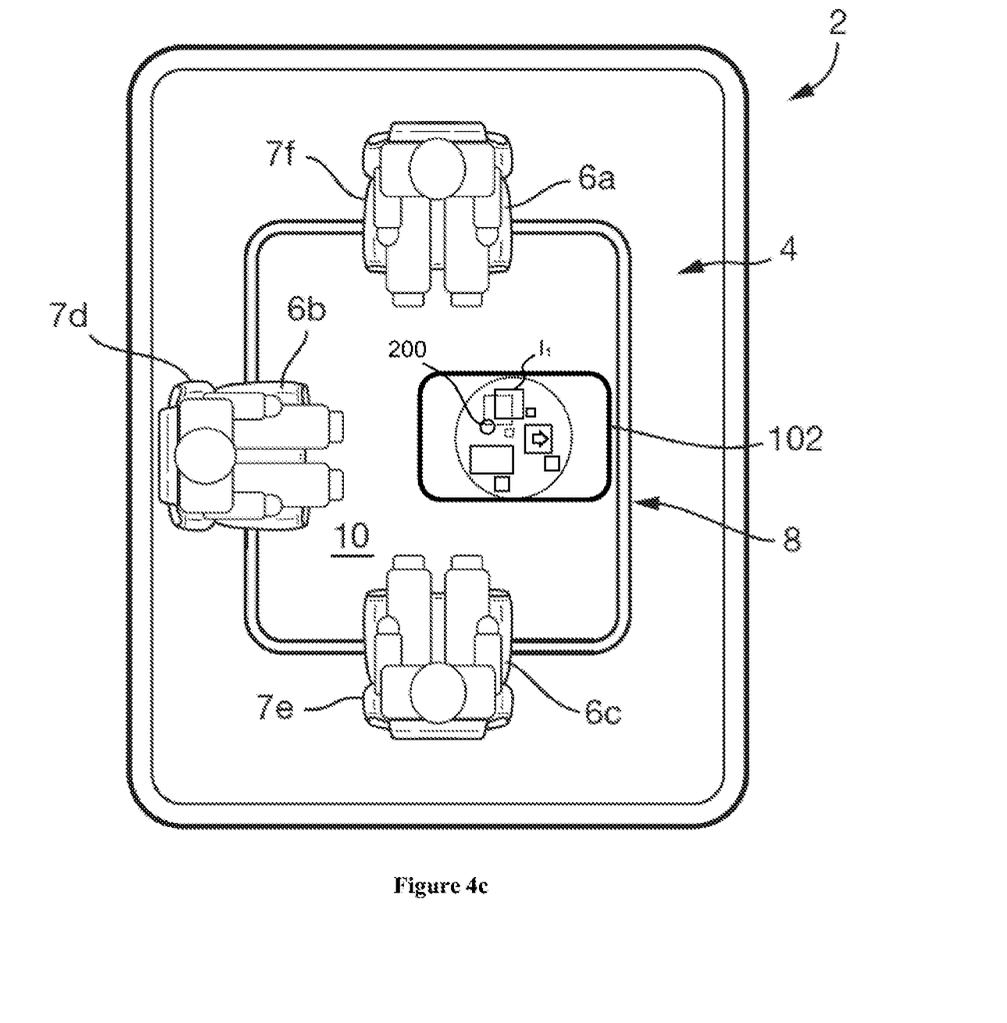

With reference to FIGS. 4A, 4B and 4C, in some arrangements of the present disclosure, the seating system 4 has one or more seats 6, such as a first seat 6a, a second seat 6b and a third seat 6c. The seats 6 are similar to the seat 150 described in relation to FIG. 1 above. The features of the seat 150 described with reference to FIG. 1 may apply equally to the seats 6.

In the arrangement shown in FIG. 4, the seats 6 are movably supported by the guide track assembly 8, such that the seats are movable between predetermined seating positions 7a, 7b, 7c, 7d, 7e, 7f defined within the vehicle.

In the arrangement shown in FIG. 4, the seating system 4 includes three seats, 6a, 6b, 6c movable between six seating positions 7a-7f However in other arrangements, the seating system 4 may have one, two, four, or more than four seats, which may be movable between two, three or more than three seating positions. In some arrangements, particular, e.g. discrete, seating positions may not be defined by the seating system, and the seats may be movable to any desired position along the guide track assembly 8.

As depicted in FIG. 4, the guide track assembly 8 has a first guide track 8a and a second guide track 8b. The second guide track 8b is arranged to the side of, e.g. radially inside of, the first guide track 8a. The first and second guide tracks 8a, 8b extend at least partially around the interior space 10 within the vehicle 2. The guide track assembly 8 therefore extends around the display surface 102 of the display system 100.

In the arrangement depicted in FIG. 4, the seating system 4 is configured such that the positions of the seats are manually adjustable by a user pushing or pulling the seats along the guide track assembly 8 into desired positions. However, in alternative arrangements, the seating system 4 may include one or more actuators (not shown) configured to move the seats 6 along the guide track assembly 8. The actuators may be coupled to the guide track assembly 8 or a frame of the vehicle 2. Alternatively, the actuators may be provided on each of seats. The seating system 4 may include a seating system controller (not shown) configured to control the operation of the actuators in order to move the seats 6 between the predetermined seating configurations, such as those depicted in FIGS. 4A, 4B and 4C.

Although the seating system 4 has been described in relation to the guide track assembly 8, it is envisaged that the present disclosure may apply to any other type of seating systems enabling the seats to translate and/or rotate.

As shown in FIG. 4, as the positions and/or orientations of the seats 6 change, e.g. between seating configurations depicted in FIGS. 4A, 4B and 4C, it may be desirable for the orientation of the image I, or a part of the image, displayed by the display system 100 to be adjusted in order to provide improved viewing angles for one or more occupants of the vehicle. For example, the positions and/or orientations of the image content items may be adjusted as the positions and/or orientations of the seats 6 change.

As shown in FIGS. 4A and 4B, when the orientation of the image I or portion of the image is changed, the position of the object 200 relative to the image, e.g. relative to the content items of the image, changes. In particular, one or more of the content items within the image I may move into the first area 202 of the display surface 102, in which the object 200 is placed. Additionally or alternatively, the image content items that have previously been moved into the second area 204 may no longer be intended to be displayed in the first area 202 of the image I. The method 300 may include a step in which the portion of the image moved into the second area is adjusted according to the position of the object relative to the image following the change in orientation of the image or part of the image.

As shown in FIGS. 4B and 4C, when the orientation of the image I or part of the image is changed, the position in the image at which a particular image content item, such as the first content item $1_1$, is intended to be displayed may remain at least partially within the first area 202 of the display screen. However, it may be desirable to adjust the size, shape and/or position of the second area 204 of the display screen into which the portion of the image is moved, so that the second area remains in the space between the object 200 and the other content items. Furthermore, it may be desirable to adjust the orientation of the portion of the image being displayed in the second area 204, so that the portion of the image remains at the same orientation as the rest of the image or part of the image that has been reoriented.

The method may therefore include a step in which the position of the second area 204 and/or the orientation of the portion of the image is adjusted according to a change in position and/or orientation of the seats.

The controller 106 may be configured to determine an orientation of the vehicle, e.g. a compass direction in which the vehicle is pointing. For example, the vehicle may include a compass, e.g. an electronic compass, or a navigation system configured to provide a signal to the controller 106 indicating the orientation of the vehicle.

The display system 100 may be configured such that the orientation of the image I or the position and/or orientation of one or more parts of the image I, such as one or more of the image content items is determined according to the orientation of the vehicle 2. The position of content items in the image may therefore vary relative to the object 200 as the orientation of the vehicle changes. In particular, one or more of the content items within the image I may move into the first area 202 of the display surface 102, in which the object 200 is placed. Additionally or alternatively, the image content items that have previously been moved into the second area 204 may no longer be intended to be displayed in the first area 202 of the image I. The method 300 may include a step in which the portion of the image moved into the second area is adjusted according to the position of the object relative to the image following the change in orientation of the vehicle.

In some arrangements, the position of a further part of the image I may remain stationary relative to the vehicle as the orientation of the vehicle changes. In this case, the positions of content items within the image may change relative to one another as the orientation of the vehicle changes. In this case, to may be desirable to adjust the second area 204 following a change in orientation of the vehicle so that the second area 204 remains in a space between content items of the image. Additionally or alternatively, it may be desirable to adjust the orientation of the portion of the image moved into the second area so that the portion of the image is oriented in the same way as the rest of the image or part of the image that has been reoriented.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure

What is claimed is:

1. A method for controlling a display system of a motor vehicle, the method comprising:
generating an image on a surface of the motor vehicle via a controller;
detecting, via the controller, an object placed on the surface by receiving measurements via the controller from one or more touch sensors provided at or below the surface, wherein the controller is capable of determining a source of an input to the one or more touch sensors between a user and the object;
adjusting the image, via the controller, such that a portion of the image is moved from a first area of the surface in which the object has been detected to a second area of the surface;
determining via the controller an orientation of one or more seats for occupants of the motor vehicle, wherein the one or more seats are pivotable between a first position to face a direction of travel of the motor vehicle and a second position to face a direction of an interior space of the motor vehicle, the orientation of the seats within an interior of the motor vehicle are variable; and displaying the image via the controller such that at least a part of the image is in a determined orientation based on the position and/or the orientation of the seats.

2. The method of claim 1, wherein the portion comprises a first content item of the image intended to be displayed at least partially within the first area; and
wherein the method further comprises:
determining via the controller that a further portion of the image has a second content item of the image, and that the second content item is associated with the first content item; and
moving, via the controller, the further portion together with the portion of the image.

3. The method of claim 2 further comprising adjusting, via the controller, at least one of a size and a shape of the further portion according to the second area of the surface.

4. The method of claim 3, wherein at least one of a size and shape of the portion and at least one of the size and the shape of the further portion are adjusted together according to the second area.

5. The method of claim 1, wherein the image is generated via the controller by projecting the image onto the surface of an interior trim portion of the motor vehicle.

6. The method of claim 1, wherein the image is generated onto the surface of an interior trim portion of the motor vehicle via the controller by one or more display elements provided at or below the surface.

7. The method of claim 1 further comprising at least one of a size and shape of at least the portion of the image to be moved according to the second area of the surface via the controller.

8. The method of claim 1 further comprising determining via the controller the portion of the image to be moved based on at least one of a size and position of the object and a content item within the image.

9. The method of claim 1 further comprising:
determining via the controller a change in the orientation of the seats;
adjusting via the controller the orientation of the image or the part thereof according to the change in the orientation of the seats; and
adjusting via the controller the portion of the image moved into the second area according to the position of the object relative to the image following the change in orientation; and
adjusting via the controller at least one of the position of the second area and the orientation of the portion of the image according to a change in the orientation of the seats.

10. The method of claim 1 further comprising determining an orientation of the motor vehicle via the controller; and
displaying via the controller the image such that at least a part of the image is in a determined orientation, wherein the determined orientation is based on at least one of a position and an orientation of at least part of the image relative to the orientation of the motor vehicle.

11. The method of claim 10 further comprising:
determining via the controller a change in the orientation of the motor vehicle;
adjusting via the controller the orientation of the image or part thereof according to the change in orientation of the motor vehicle;
adjusting via the controller the portion of the image moved into the second area according to the position of the object relative to the image following the change in orientation; and
adjusting via the controller at least one of the position of the second area and the orientation of the portion of the image according to a change in orientation of the motor vehicle.

12. A method for controlling a display system of a motor vehicle, the method comprising:
generating an image on a surface of the motor vehicle via a controller;
detecting, via the controller, an object placed on the surface;
determining via the controller an orientation of a seat for an occupant of the motor vehicle, wherein the seat is pivotable between a first position to face a direction of travel of the motor vehicle and a second position to face a direction of an interior space of the motor vehicle, the orientation of the seat within an interior of the motor vehicle being variable;
displaying the image via the controller such that at least a part of the image is in a determined orientation based on the orientation of the seat; and
adjusting the image, via the controller, such that a portion of the image is moved from a first area of the surface in which the object has been detected to a second area of the surface.

13. The method of claim 12 further comprising:
determining via the controller a change in the orientation of the seat;
adjusting via the controller the orientation of the image or the part thereof according to the change in the orientation of the seat; and
adjusting via the controller the portion of the image moved into the second area according to the position of the object relative to the image following the change in orientation; and
adjusting via the controller at least one of the position of the second area and the orientation of the portion of the image according to a change in the orientation of the seat.

14. The method of claim 12 wherein the image is generated via the controller by projecting the image from a roof of the motor vehicle onto the surface, the surface being provided on an upper surface of a table positioned within an interior space of the motor vehicle.

* * * * *